(No Model.)

F. POST.
NUT LOCK.

No. 412,786. Patented Oct. 15, 1889.

Witnesses
W. P. Keene
J. E. Middleton

Inventor
Ferdinand Post
by Eli Spear
atty

UNITED STATES PATENT OFFICE.

FERDINAND POST, OF BATON ROUGE, LOUISIANA.

NUT-LOCK.

SPECIFICATION forming part of Letters Patent No. 412,786, dated October 15, 1889.

Application filed June 1, 1889. Serial No. 312,866. (No model.)

*To all whom it may concern:*

Be it known that I, FERDINAND POST, of Baton Rouge, in the parish of East Baton Rouge and State of Louisiana, have invented a new and useful Improvement in Nut-Locks; and I do hereby declare that the following is a full, clear, and exact description of the same.

My invention is an improvement in that class of nut-locks in which a plate is used between two bolts and adapted to hold the nuts in place by supporting the plate in such relation to the nuts as to prevent the same from turning except under abnormal conditions.

The object of the invention is principally to secure simplicity in the construction of the means used to lock the nut and without requiring change in the construction of the parts now used, and at the same time to provide a construction which will be economical to make and capable of being applied by unskilled labor.

Figure 1:
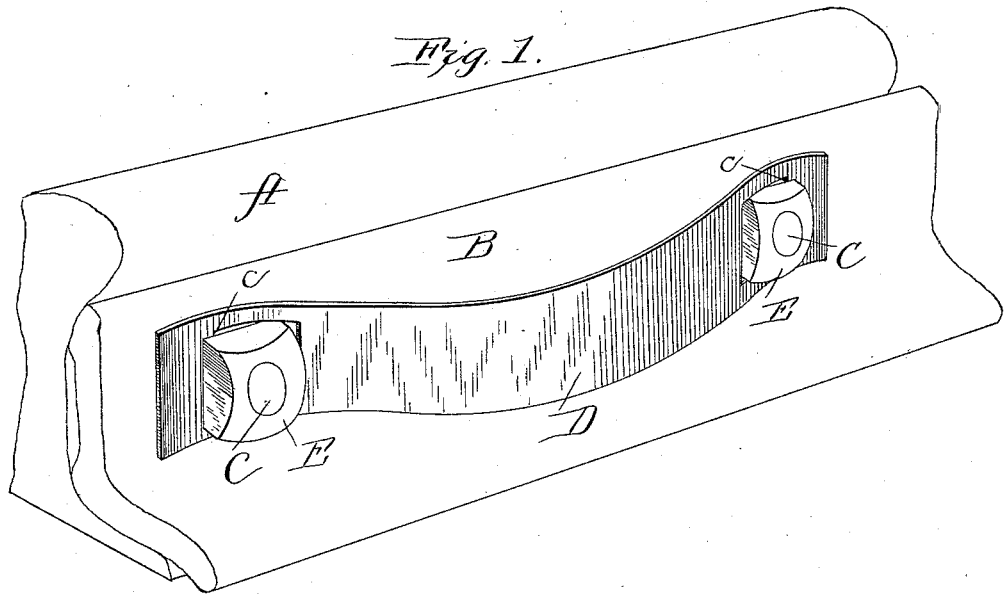
Figure 2:
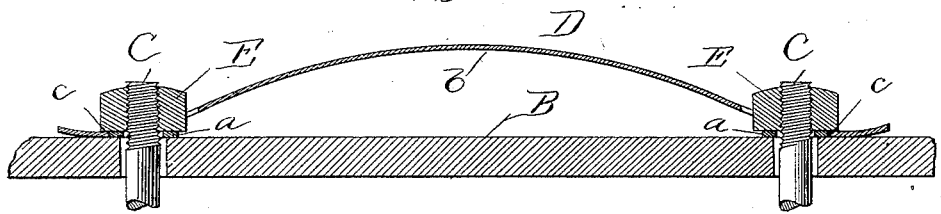

In the accompanying drawings, Figure 1 is a perspective view showing my improved locking-plate in position. Fig. 2 is a sectional view through the bolt, nut, and plate.

In the drawings I have shown the invention as applied to the fish-plate of a railway-rail; but it will be understood that I do not limit myself to this connection, as the invention may be applied without material change and with equally good results to lock-nuts in other situations. The rail is shown at A and the fish-plate at B. Ordinary bolts C, provided with nuts E, are used to secure the fish-plate to the rail, and my improved locking-plate adapted to prevent the nuts from turning off is shown at D. Between the nuts and the base of the fish-plate I place washers *a*, which, when the nuts are screwed down upon them, leave a space between the under face of the nut and the fish-plate, the said washers being of less diameter than the nuts.

My locking-plate is of spring metal, and has its central portion curved, as shown at *b*, with its ends slightly flattened. The square hole is punched out at each end of approximately the size of the nuts, and these holes are so placed relatively to the nuts or the position of the bolts as to register with the said nuts when the plate is flattened out. It will thus be seen that when the plate is flattened out upon the fish-plate, with the openings therein registering with the bolts, the nuts may be screwed upon the bolts until they bear firmly upon the washers beneath them, care being taken to bring the nuts squarely into alignment with the openings in the spring-plate, and when this is done the central portion of the spring-plate is relieved from its pressure, and it immediately bulges outward, drawing the outer edges *c c* of each opening in the plate beneath the adjacent edge of the nut, and the curve of the spring-plate is such as to bring the sides of the opening at each end above the bottom line of the nuts, and thus an obstruction is offered to the turning of the nut and a perfect lock formed. No amount of jarring can shake the plate loose, and in order to free it it is necessary to depress its central portion, and while thus depressed to loosen the nuts and remove them.

Instead of first placing the plate over the bolt and then screwing on the nuts, the nuts may be screwed on the bolts first and the spring-plate slipped into place over the nut.

Instead of the washers beneath the nut, the same object may be attained by cutting away the lower edges of each nut, which would thus provide a recess; but the first form is the preferred one, as the use of the washer would lessen the cost.

I claim as my invention—

In combination, with a pair of bolts and their nuts, a locking-plate for said nuts of spring metal, having its central portion curved outwardly and its ends slightly flattened, holes at its ends adapted to register with the nut when the plate is flattened out, but drawing the outer edges of each opening in the plate beneath the adjacent edges of the nut when the spring-plate is relieved from its pressure, whereby the sides of the opening in the spring-plate are brought above the bottom line of the nut, and thus the turning of the nut prevented, substantially as described.

In testimony whereof I have signed my name to this specification in the presence of two subscribing witnesses.

FERDINAND POST.

Witnesses:
H. L. SHIPPERS,
F. H. HARVEY.